United States Patent
Liao et al.

(10) Patent No.: US 12,550,941 B2
(45) Date of Patent: Feb. 17, 2026

(54) VAPORIZER AND ELECTRONIC VAPORIZATION DEVICE

(71) Applicant: SHENZHEN SMOORE TECHNOLOGY LIMITED, Guangdong (CN)

(72) Inventors: Junfeng Liao, Shenzhen (CN); Zhanggui Lan, Shenzhen (CN); Zhihua Wen, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 497 days.

(21) Appl. No.: 17/988,203

(22) Filed: Nov. 16, 2022

(65) Prior Publication Data

US 2023/0157368 A1   May 25, 2023

(30) Foreign Application Priority Data

Nov. 19, 2021   (CN) .......................... 202122862028.4

(51) Int. Cl.
*A24F 47/00*   (2020.01)
*A24F 7/00*   (2006.01)
(Continued)

(52) U.S. Cl.
CPC .............. *A24F 40/485* (2020.01); *A24F 7/00* (2013.01); *A24F 40/10* (2020.01); *A24F 40/42* (2020.01)

(58) Field of Classification Search
CPC ........... A24F 40/42; A24F 40/485; A24F 7/00
(Continued)

(56) References Cited

U.S. PATENT DOCUMENTS 4,026,475 A * 5/1977 Vicard .................. B05B 1/3426
                                                         239/468
4,540,124 A * 9/1985 Haruch ................. B05B 3/1064
                                                         239/223
(Continued)

FOREIGN PATENT DOCUMENTS

CN         105476073 A      4/2016
CN         111728281 A      10/2020
(Continued)

OTHER PUBLICATIONS

European Patent Office, Search Report in European Patent Application No. 22206844.7 (Apr. 19, 2023).
(Continued)

*Primary Examiner* — Eric Yaary
(74) *Attorney, Agent, or Firm* — Leydig, Voit & Mayer, Ltd.

(57) ABSTRACT

A vaporizer includes: a liquid storage shell, a liquid storage space and an airflow channel being formed within the liquid storage shell; an end cap covering one end of the liquid storage space, a vent hole in communication with the airflow channel being formed on the end cap; and a liquid absorbing member arranged on the end cap, an air outlet hole in communication with the vent hole being formed on the liquid absorbing member. The end cap includes a supporting surface for contact with the liquid absorbing member. At least one first liquid guide groove is provided on the supporting surface. Each of the at least one first liquid guide groove comprises a first end in communication with the vent hole and a second end away from the vent hole.

17 Claims, 11 Drawing Sheets

(51) Int. Cl.
    *A24F 40/10*     (2020.01)
    *A24F 40/42*     (2020.01)
    *A24F 40/485*     (2020.01)

(58) Field of Classification Search
    USPC .............................................. 24/40
    See application file for complete search history.

(56) References Cited

U.S. PATENT DOCUMENTS

| | | | |
|---|---|---|---|
| 4,784,043 A * | 11/1988 | Kobayashi | F22B 31/00 |
| | | | 431/174 |
| 9,555,198 B2 | 1/2017 | Yang et al. | |
| 2016/0029700 A1 | 2/2016 | Li et al. | |
| 2016/0073694 A1 | 3/2016 | Liu | |
| 2018/0077967 A1 * | 3/2018 | Hatton | A24F 40/40 |
| 2018/0289066 A1 | 10/2018 | Mo et al. | |
| 2019/0001077 A1 | 1/2019 | Xu et al. | |
| 2021/0186097 A1 | 6/2021 | Schmidt et al. | |
| 2022/0079227 A1 * | 3/2022 | Lin | A24F 40/51 |

FOREIGN PATENT DOCUMENTS

| | | | |
|---|---|---|---|
| CN | 212088063 U | 12/2020 | |
| CN | 112656032 A | 4/2021 | |
| CN | 213029728 U | 4/2021 | |
| CN | 214160108 U | 9/2021 | |
| CN | 214179125 U | 9/2021 | |
| EP | 3753595 A1 * | 12/2020 | A24F 40/40 |

OTHER PUBLICATIONS

European Patent Office, Search Report in European Patent Application No. 22206868.6 (May 9, 2023).

European Patent Office, Search Report in European Patent Application No. 22206847.0 (May 24, 2023).

* cited by examiner

VAPORIZER AND ELECTRONIC VAPORIZATION DEVICE

CROSS-REFERENCE TO PRIOR APPLICATION

Priority is claimed to Chinese Patent Application No. 202122862028.4, filed on Nov. 19, 2021, the entire disclosure of which is hereby incorporated by reference herein.

FIELD

The present disclosure relates to the field of vaporization, and more specifically, to a vaporizer and an electronic vaporization device.

BACKGROUND

An electronic vaporization device is generally used to heat and vaporize a to-be-vaporized liquid stored therein to form vapor for a user to inhale. The user generally inhales the vapor via an inhalation channel in the gas delivery channel of the electronic vaporization device. In the process of inhalation, a part of vapor is condensed on the side wall of the gas delivery channel to form a condensate, which, if not treated, will be easily inhaled by the user, affecting user experience.

SUMMARY

In an embodiment, the present invention provides a vaporizer, comprising: a liquid storage shell, a liquid storage space and an airflow channel being formed within the liquid storage shell; an end cap covering one end of the liquid storage space, a vent hole in communication with the airflow channel being formed on the end cap; and a liquid absorbing member arranged on the end cap, an air outlet hole in communication with the vent hole being formed on the liquid absorbing member, wherein the end cap comprises a supporting surface configured for contact with the liquid absorbing member, wherein at least one first liquid guide groove is provided on the supporting surface, and wherein each of the at least one first liquid guide groove comprises a first end in communication with the vent hole and a second end away from the vent hole.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
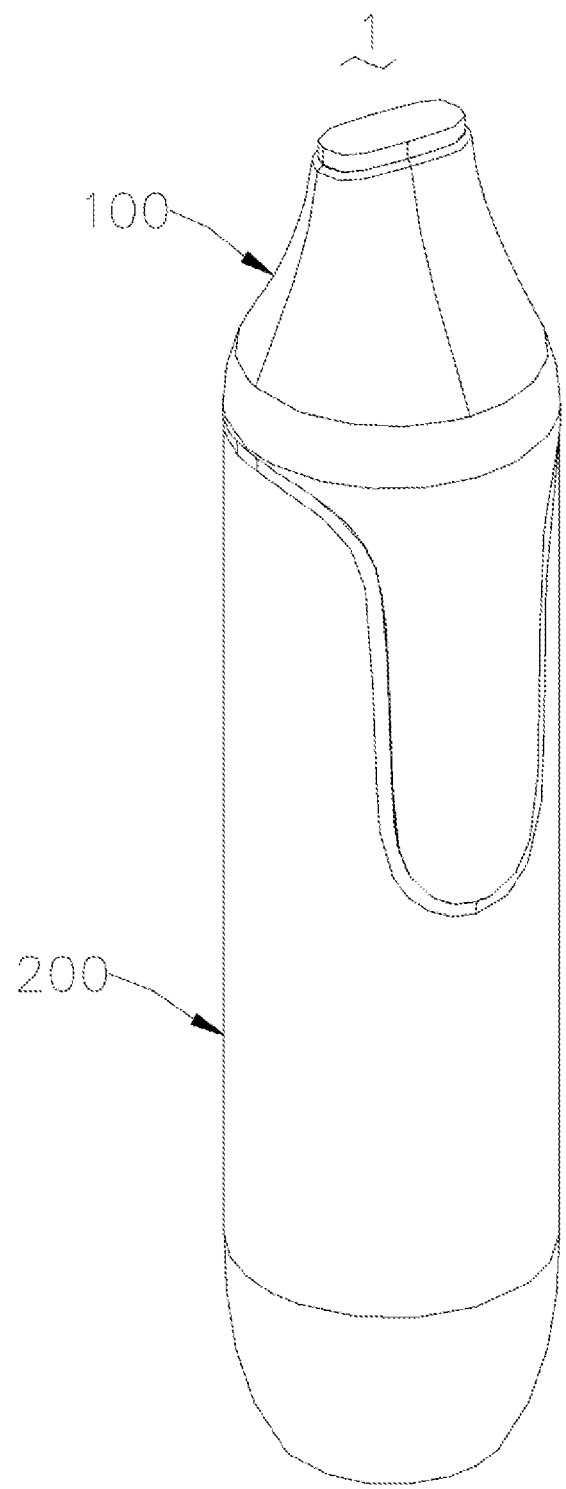
FIG. 1 is a schematic three-dimensional structural diagram of an electronic vaporization device according to a first embodiment of the present disclosure.

In an embodiment, the present invention provides an improved vaporizer and an electronic vaporization device with the improved vaporized for the defects in the related art.

In an embodiment, the present invention provides a vaporizer, including:

a liquid storage shell, where a liquid storage space and an airflow channel are formed within the liquid storage shell;

an end cap covering one end of the liquid storage space, where a vent hole in communication with the airflow channel is formed on the end cap; and a liquid absorbing member arranged on the end cap, where an air outlet hole in communication with the vent hole is formed on the liquid absorbing member;

where, the end cap includes a supporting surface configured for contact with the liquid absorbing member, at least one first liquid guide groove is provided on the supporting surface, and each of the at least one first liquid guide groove includes a first end in communication with the vent hole and a second end away from the vent hole.

In some embodiments, the second end of the first liquid guide groove extends at least to communicate with an outer edge of the liquid absorbing member.

In some embodiments, two or more first liquid guide grooves are provided on the supporting surface.

In some embodiments, the two or more first liquid guide grooves are distributed evenly along a circumferential direction of the supporting surface.

In some embodiments, the first liquid guide groove is a linear groove or a curved groove.

In some embodiments, the first liquid guide groove is a linear groove and extends along a radial direction of the supporting surface.

In some embodiments, a maximum length of the first liquid guide groove is greater than or equal to a radius of the liquid absorbing member.

In some embodiments, a number of the first liquid guide grooves is proportional to a cross-sectional area of the vent hole.

In some embodiments, at least one second liquid guide groove in communication with the at least one first liquid guide groove is further provided on the supporting surface.

In some embodiments, the second liquid guide groove is in an annular shape.

In some embodiments, at least two second liquid guide grooves are provided on the supporting surface.

In some embodiments, a plurality of the second liquid guide grooves are provided on the supporting surface, and a distance between every two adjacent second liquid guide grooves in the plurality of second liquid guide grooves gradually decreases in a direction away from the vent hole.

In some embodiments, the first liquid absorbing member is a liquid absorbing cotton.

In some embodiments, the end cap includes a cylindrical nesting portion extending into the airflow channel. In some embodiments, a length by which the nesting portion extends into the airflow channel is less than or equal to 6.5 mm.

In some embodiments, a material of the end cap includes silica gel.

In some embodiments, the vaporizer further includes a vent tube inserted into the liquid storage shell, where the airflow channel is defined by an inner wall surface of the vent tube, and the liquid storage space is defined between an outer wall surface of the vent tube and an inner wall surface of the liquid storage shell.

In some embodiments, the vaporizer further includes the liquid storage member arranged in the liquid storage space, where the vent tube is inserted into the liquid storage member.

In some embodiments, the vaporizer further includes a suction nozzle arranged on one end of the liquid storage shell, where an inhalation channel in communication with the air outlet hole is formed on the suction nozzle.

The present disclosure further provides an electronic vaporization device, including a vaporizer according to any one of the foregoing embodiments.

Implementation of the present disclosure has at least the following beneficial effects: Condensate at the vent hole may be guided by the first liquid guide groove, and then absorbed by the liquid absorbing member in contact with the first liquid guide groove, thereby increasing the liquid absorption speed of the liquid absorbing member.

In order to have a clearer understanding of the technical features, the objectives, and the effects of the present disclosure, specific implementations of the present disclosure are now illustrated in detail with reference to the accompanying drawings. Many specific details are set forth in the following description in order to facilitate a full understanding of the present disclosure. However, the present disclosure can be implemented in many other ways than those described herein, and a person skilled in the art may make similar improvements without contradicting the intent of the present disclosure, so that the present disclosure is not limited by the specific embodiments disclosed below.

In the description of the present disclosure, it should be understood that, orientation or position relationships indicated by terms such as "center", "longitudinal", "transverse", "length", "width", "thickness", "upper", "lower", "front", "rear", "left", "right", "vertical", "horizontal", "top", "bottom", "inner", "outer", "axial", "radial", and "circumferential" are orientation or position relationships shown based on the accompanying drawings, or orientation or position relationships that usually placed for the use of the present disclosure product, and are merely used for describing the present disclosure and simplifying the description, rather than indicating or implying that the mentioned apparatus or element should have a particular orientation or be constructed and operated in a particular orientation, and therefore, should not be construed as a limitation to the present disclosure.

In addition, the terms "first" and "second" are used for descriptive purposes only and are not to be construed as indicating or implying relative importance or implicitly indicating the number of technical features indicated. Therefore, a feature restricted by "first" or "second" may explicitly indicate or implicitly include at least one of such features. In the description of the present disclosure, unless otherwise explicitly defined, "a plurality of" means at least two, for example, two, three, and the like.

In the present disclosure, unless otherwise explicitly specified and defined, terms such as "mounted", "connected", "connection", and "fixed" should be understood in a broad sense. For example, the connection may be a fixed connection, a detachable connection, or an integral connection; or the connection may be a mechanical connection or an electrical connection; or the connection may be a direct connection, an indirect connection through an intermediate medium, or internal communication between two elements or mutual action relationship between two elements, unless otherwise explicitly specified. A person of ordinary skill in the art may understand the specific meanings of the foregoing terms in this present disclosure according to specific situations.

In the present disclosure, unless otherwise explicitly specified and defined, a first feature is "on" or "below" a second feature may indicate that the first feature and the second feature are in direct contact, or the first feature and the second feature are in indirect contact through an intermediate medium. In addition, the first feature is "above", "over", and "on" the second feature may indicate that the first feature is directly above or obliquely above the second feature, or may merely indicate that the horizontal position of the first feature is higher than that of the second feature. The first feature is "below", "under", and "beneath" the second feature may indicate that the first feature is directly below or obliquely below the second feature, or may merely indicate that the horizontal position of the first feature is lower than that of the second feature.

Figure 2:
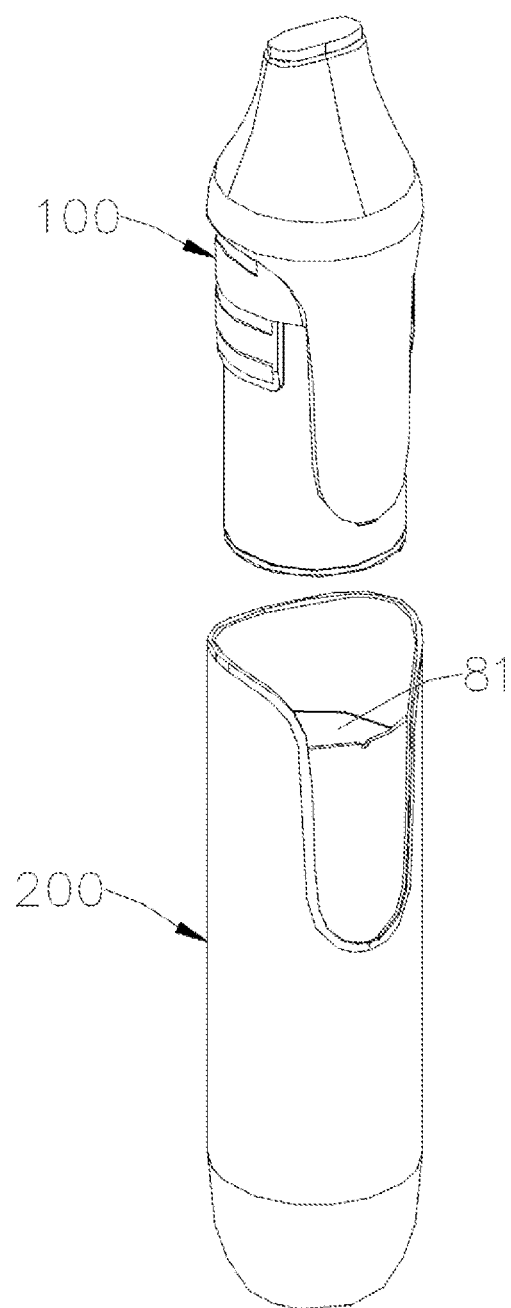
FIG. 2 is a schematic structural exploded view of the electronic vaporization device shown in FIG. 1.
Figure 3:
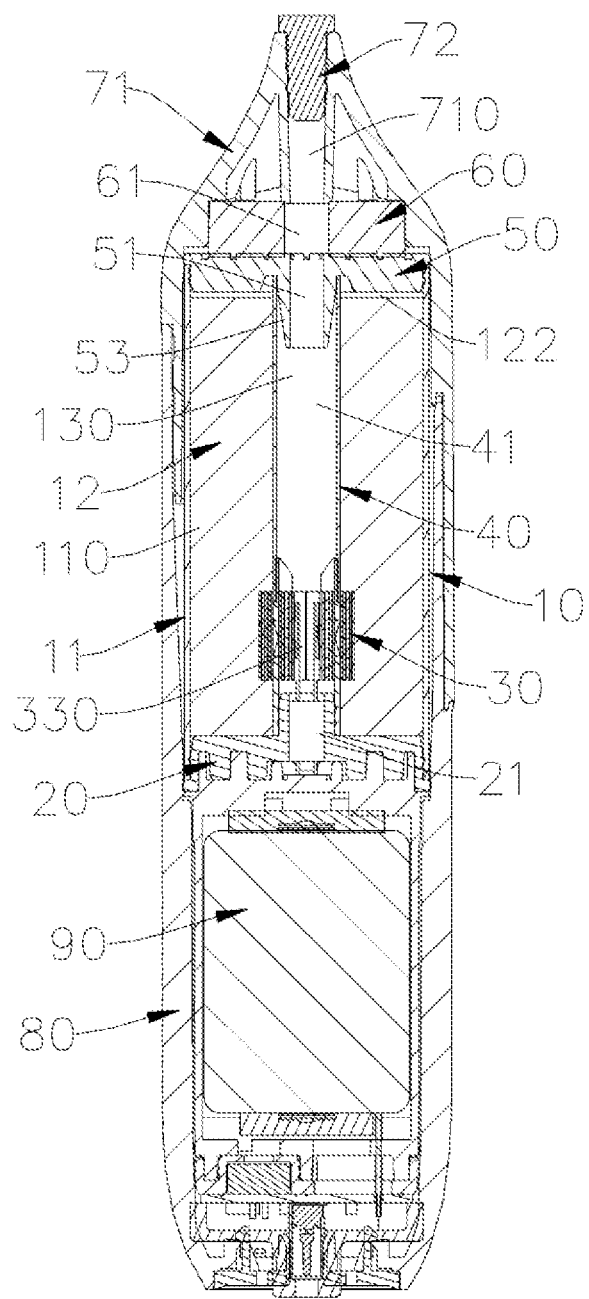
FIG. 3 is a schematic structural cross-sectional view of the electronic vaporization device shown in FIG. 1 taken along a longitudinal direction.

FIG. 1 to FIG. 3 show an electronic vaporization device 1 in a first embodiment of the present disclosure. In some embodiments, the electronic vaporization device 1 may be substantially in a shape of a cylinder and may include a power supply device 200 and a vaporizer 100 arranged above the power supply device 200 along a longitudinal direction. The vaporizer 100 is configured to accommodate a to-be-vaporized liquid and heat the to-be-vaporized liquid to generate an aerosol, and the power supply device 200 is configured to supply power to the vaporizer 100. It may be understood that, in some other embodiments, the electronic vaporization device 1 is not limited to be the shape of a cylinder, and may be in other shapes such as an oval cylinder, a square cylinder, a flat cylinder, and the like.

The power supply device 200 may include a housing 80 and a battery 90 accommodated in the housing 80. The battery 90 is electrically connected to a heating component 30 of the vaporizer 100, and is configured to supply power to the heating component 30. The housing 80 may be substantially cylindrical in shape. The battery 90 may be accommodated in a lower part of the housing 80. An accommodating space 81 for accommodating the vaporizer 100 is formed on an upper part of the housing 80.

Figure 4:
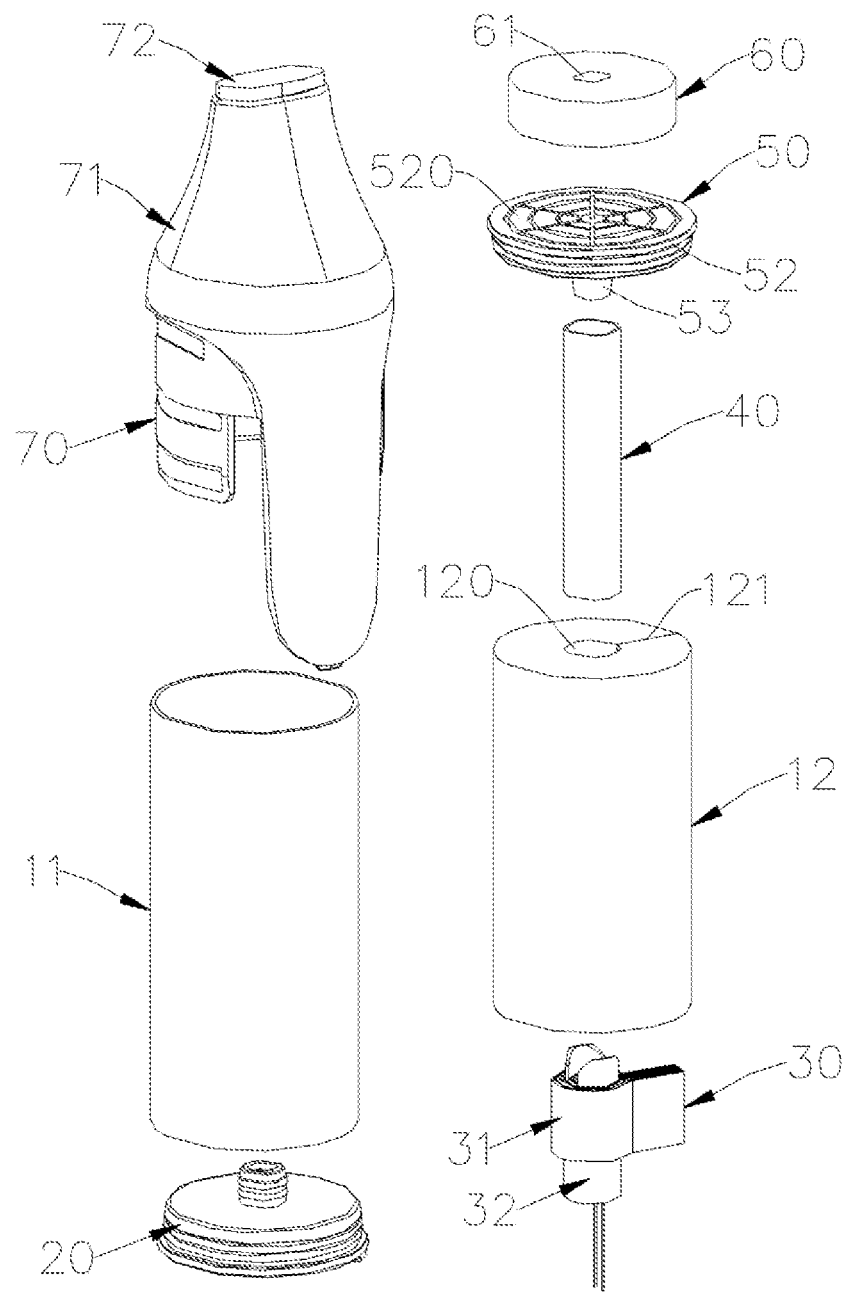
FIG. 4 is a schematic structural exploded view of a vaporizer in FIG. 2.

As shown in FIG. 3 and FIG. 4, in some embodiments, the vaporizer 100 may include a liquid storage container 10, a base 20, a heating component 30, a vent tube 40, an end cap 50, a liquid absorbing member 60, and a suction nozzle assembly 70.

The liquid storage container 10 is configured to store the to-be-vaporized liquid, and may include a liquid storage shell 11. In this embodiment, the liquid storage shell 11 is in a shape of a cylinder with openings on two ends. The vent tube 40 is inserted into the liquid storage shell 11 along the longitudinal direction and may be arranged coaxially with the liquid storage shell 11. A liquid storage space 110 in an annular shape is formed between an outer wall surface of the vent tube 40 and an inner wall surface of the liquid storage shell 11. An airflow channel 41 is defined by an inner wall surface of the vent tube 40. In some embodiments, the vent tube 40 may be a fiberglass tube to reduce cost. In some other embodiments, the vent tube 40 may also be made of other materials such as plastic, metal, or the like.

In some embodiments, the liquid storage container 10 may further include a liquid storage member 12 arranged in the liquid storage space 110 for absorbing and storing a certain amount of the to-be-vaporized liquid. The liquid storage member 12 is in the shape of an annular column, and a through hole 120 for insertion of the vent tube 40 is formed on the liquid storage member 12 along the longitudinal direction. The liquid storage member 12 may generally be a liquid storage cotton, so as to absorb and store a large amount of the to-be-vaporized liquid. In some embodiments, a fastening opening 121 is formed on a side wall of the liquid storage member 12, to render the liquid storage member 12 in the shape of a C-shaped cylinder, so that the liquid storage member 12 can be easily clamped on a periphery of the vent tube 40.

The heating component 30 is arranged in the liquid storage shell 11 and is in contact with the liquid storage member 12, and is configured to heat and vaporize the to-be-vaporized liquid stored in the liquid storage member 12 after being electrified. A vaporization cavity 330 may be formed on the heating component 30 along the longitudinal direction, and the vaporization cavity 330 may be communicated with a lower end of the airflow channel 41. The heating component 30 may include a composite liquid guide cotton 31 that is in contact with the liquid storage member 12 for absorbing the to-be-vaporized liquid from the liquid storage member 12, a heating body 33 arranged in the composite liquid guide cotton 31 for heating and vaporizing the to-be-vaporized liquid after being electrified, and a heating base 32 for supporting the composite liquid guide cotton 31.

Figure 5:
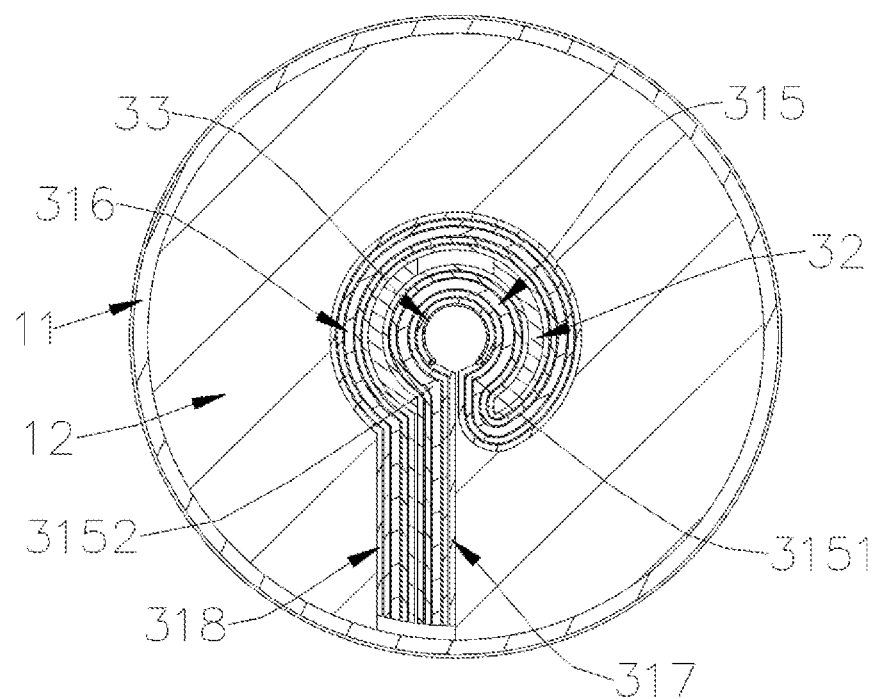
FIG. 5 is a schematic structural cross-sectional view of a vaporizer in FIG. 2 taken along a transverse direction.
Figure 6:
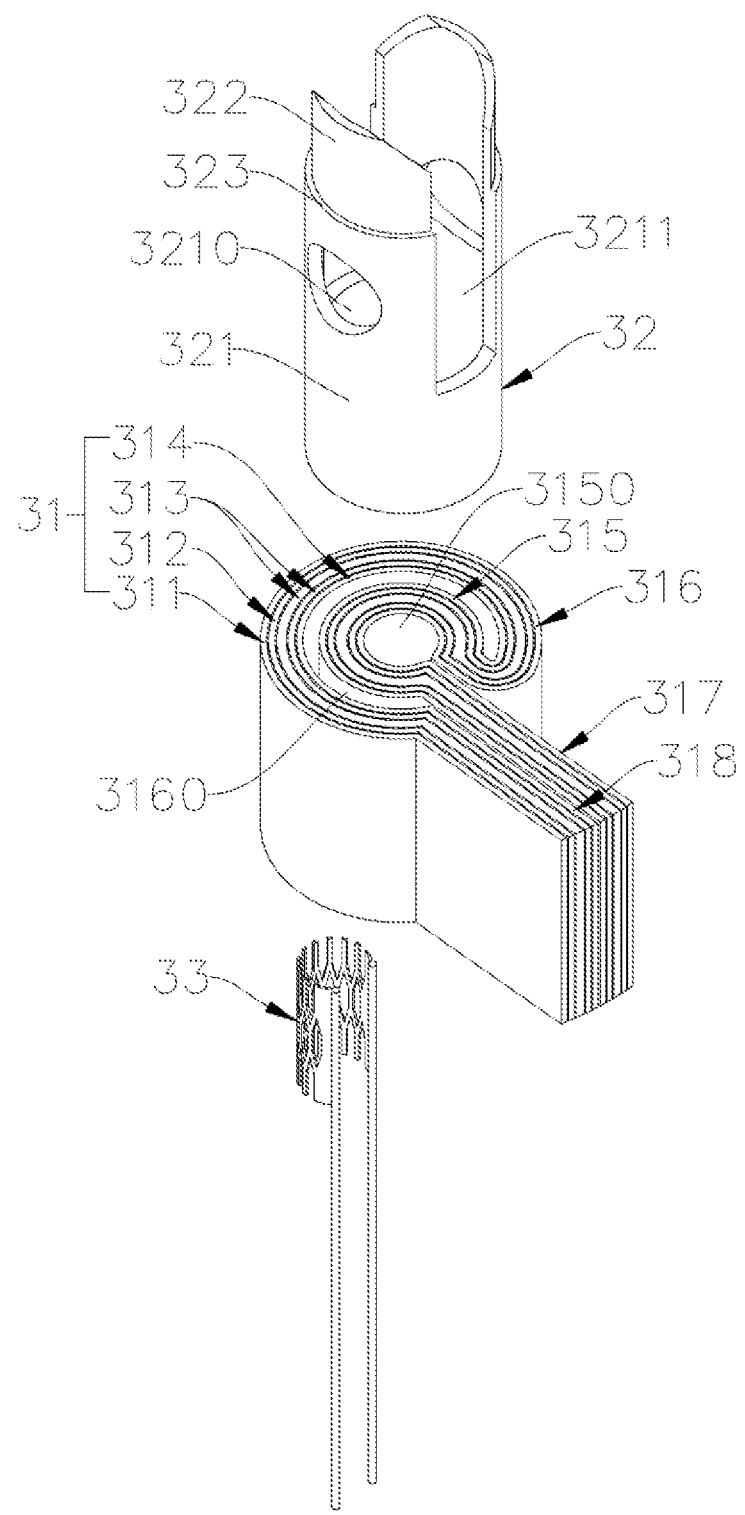
FIG. 6 is a schematic structural exploded view of a heating component in FIG. 4.

As shown in FIG. 5 to FIG. 6, in some embodiments, the composite liquid guide cotton 31 may include at least one heat-resistant layer 311, at least one first isolation layer 312, at least one fast liquid guide layer 313, and at least one second isolation layer 314 laminated in sequence.

The at least one heat-resistant layer 311 may be in contact with the liquid storage member 12 and the heating body 33 respectively, and may be made of a material with fast liquid absorption and high temperature resistance, to prevent the production of a burning smell during heating. In this embodiment, one heat-resistant layer 311 made of linen cotton is provided, which has the advantages of fast liquid absorption, fast absorption and drying, high temperature resistance, being not likely to cause a burning smell, and antibacterial properties. The linen cotton may have a weight per square meter of 45 grams±10% before being soaked with a liquid. The linen cotton soaked with the to-be-vaporized liquid has a temperature resistance value of 200° C. or above, preferably, 300° C. or above. The fast liquid guide layer 313 has a high liquid conduction rate, which is higher than those of the heat-resistant layer 311, the first isolation layer 312, and the second isolation layer 314. In this embodiment, two fast liquid guide layers 313 made of wood pulp cotton may be provided. The wood pulp cotton may have a weight per square meter of 50 grams±10% before being soaked with a liquid. The arrangement of the two layers of wood pulp cotton stacked together can further increase the liquid conduction speed. In some other embodiments, one or more than two fast liquid guide layers 313 may be provided.

The first isolation layer 312 and the second isolation layer 314 may be made of a material capable of isolating unpleasant smell, providing fast liquid conduction and having high liquid storage capacity. The materials of the first isolation layer 312 and the second isolation layer 314 may be the same or different. The first isolation layer 312 and the second isolation layer 314 are respectively arranged on two opposing sides of the fast liquid guide layer 313, and can isolate an unpleasant smell that may be generated by the material of the fast liquid guide layer 313, allowing for the selection of the material of the fast liquid guide layer 313 from a broader range of materials. In this way, the material of the fast liquid guide layer 313 may be selected by considering only the liquid conduction rate, without worrying about whether the selected material generates an unpleasant smell. In addition, the liquid storage capacities of the first isolation layer 312 and the second isolation layer 314 are higher than that of the fast liquid guide layer 313, that is, the amounts of liquid absorbed per unit volume of the first isolation layer 312 and the second isolation layer 314 at saturation are greater than that of the fast liquid guide layer 313.

In some embodiments, the liquid storage capacities of the first isolation layer 312 and the second isolation layer 314 are higher than that of the heat-resistant layer 311, and the liquid storage capacity of the heat-resistant layer 311 is higher than that of the fast liquid guide layer 313. The first isolation layer 312 and the second isolation layer 314 can store a large amount of the to-be-vaporized liquid, thereby further avoiding the occurrence of dry burning. In this embodiment, one first isolation layer 312 and one second isolation layer 314 which are made of a non-woven fabric are provided. The non-woven fabric may have a weight per square meter of 75 grams±10% and a thickness of 0.3-0.4 mm before being soaked with a liquid. Using the non-woven fabric which is 75 grams per square meter can increase the liquid storage capacity of the composite liquid guide cotton 31. In some other embodiments, the first isolation layer 312 and the second isolation layer 314 may also be made of blended cotton (a blend of linen cotton and a non-woven fabric), a black-spotted (cottonseed) non-woven fabric, tea fibers, or other materials.

The composite liquid guide cotton 31 may include a first liquid guide portion 315, a second liquid guide portion 316, a first extension portion 317, and a second extension portion 318.

The first liquid guide portion 315 is in an annular shape with an opening on a cross-section thereof, and includes a first end 3151 and a second end 3152 opposite to the first end 3151 along a circumferential direction. The first liquid guide portion 315 includes a heat-resistant layer 311, a first isolation layer 312, a fast liquid guide layer 313, and a second isolation layer 314 from inside to outside. A first cavity 3150 is defined by an inner wall surface of the first liquid guide portion 315, and the first cavity 3150 forms the vaporization cavity 330.

The heating body 33 may be arranged on the inner wall surface of the first liquid guide portion 315, that is, the heating body 33 is arranged on the heat-resistant layer 311 of the first liquid guide portion 315. In this embodiment, the heating body 33 may be a cylindrical heating sheet. In some other embodiments, the heating body 33 may be a helical heating wire, a heating film, or other structures.

The second liquid guide portion 316 is in an annular shape and is arranged on a periphery of the first liquid guide portion 315, and may be arranged coaxially with the first liquid guide portion 315. The second liquid guide portion 316 includes a heat-resistant layer 311, a first isolation layer 312, a fast liquid guide layer 313, and a second isolation layer 314 from outside to inside. An inner diameter of the second liquid guide portion 316 is larger than an outer diameter of the first liquid guide portion 315. A second cavity 3160 in an annular shape is formed between an inner wall surface of the second liquid guide portion 316 and an outer wall surface of the first liquid guide portion 315. The second cavity 3160 is configured for insertion of the heating base 32 therein. That is, an inner wall surface of the heating base 32 is in contact with the second isolation layer 314 which is the outermost layer of the first liquid guide portion 315, and an outer wall surface of the heating base 32 is in contact with the second isolation layer 314 which is the innermost layer of the second liquid guide portion 316.

The heating base 32 may be in a shape of a circular tube, and may include a base body 321 and an extension portion 322 extending upward from an upper end of the base body 321. Inner diameters of the base body 321 and the extension portion 322 are equal, and an outer diameter of the base body 321 may be larger than that of the extension portion 322, so that a step surface 323 is formed at the junction of the base body 321 and the extension portion 322. A lower end of the vent tube 40 may be sleeved outside the extension portion 322. An end surface of a lower end of the vent tube 40 may abut against the step surface 323. An outer diameter of the vent tube 40 may be equal to that of the base body 321.

The first liquid guide portion 315 may be accommodated in the base body 321. At least one liquid inlet hole 3210 is further formed on a side wall of the base body 321, so that the to-be-vaporized liquid in the liquid storage member 12 can enter the base body 321 through the at least one liquid inlet hole 3210 and be absorbed by the first liquid guide portion 315. In this embodiment, two liquid inlet holes 3210 are provided, and the two liquid inlet holes 3210 may be arranged symmetrically along a circumferential direction of the base body 321.

At least one slot 3211 may further be arranged on the side wall of the heating base 32. The at least one slot 3211 may extend downward along an axial direction from an end surface of an upper end of the extension portion 322. The first end 3151 and the second end 3152 of the first liquid guide portion 315 may run out through the at least one slot 3211. In addition, the at least one slot 3211 also has a function of communicating the liquid storage member 12 with the first liquid guide portion 315. In this embodiment, two slots 3211 are provided, the two slots 3211 may be arranged symmetrically along a circumferential direction of the heating base 32, and the slots 3211 may be arranged at an angle of 90 degrees relative to the liquid inlet holes 3210 along the circumferential direction of the heating base 32.

The first end 3151 of the first liquid guide portion 315 runs out through the slot 3211 and is connected to a circumferential end of the second liquid guide portion 316. The second end 3152 of the first liquid guide portion 315 runs out through the slot 3211 and then extends outward along a radial direction to form the first extension portion 317. An other circumferential end of the second liquid guide portion 316 is connected to the second extension portion 318. An extension direction of the second extension portion 318 may be the same as that of the first extension portion 317. The second extension 318 and the first extension 317 may converge and be engaged in the fastening opening 121 of the liquid storage member 12.

During assembly of the heating component 30, first, a sheet-like composite liquid guide cotton material may be wrapped around the heating component 33 to form the first liquid guide portion 315. Then, the first liquid guide portion 315 wrapping the heating component 33 is inserted downward into the heating base 32 through an opening at an upper end of the heating base 32, so that the second end 3152 of the first liquid guide portion 315 runs out through the slot 3211 in the radial direction to form the first extension portion 317, and the first end 3151 of the first liquid guide portion 315 runs out through the slot 3211 and is wound around the heating base 32 to form the second liquid guide portion 316. Then the other end of the second liquid guide portion 316 is bonded to the first extension portion 317 to form the second extension portion 318. Finally, the liquid storage member 12 is wrapped around the heating component 30, and the first extension 317 and the second extension 318 which are bonded together are engaged in the fastening opening 121 of the liquid storage member 12.

In this embodiment, the second liquid guide portion 316, the first extension portion 317, and the second extension portion 318 of the composite liquid guide cotton 31 are all in contact with the liquid storage member 12, thereby greatly increasing the contact area between the composite liquid guide cotton 31 and the liquid storage member 12 and greatly increasing the liquid absorption speed of the composite liquid guide cotton 31.

As shown in FIG. 3 to FIG. 4, the base 20 and the end cap 50 cover two ends of the liquid storage space 110 respectively, and may be respectively made of an elastic material such as silica gel, so as to sealedly block the two ends of the liquid storage space 110 to reduce liquid leakage. Specifically, the base 20 may be embedded in an opening at a lower end of the liquid storage shell 11, that is, in an opening at the end of the liquid storage shell 11 close to the battery 90. The base 20 may be configured to support the liquid storage member 12 and the heating component 30. An air guide hole 21 in communication with the vaporization cavity 330 may be formed on the base 20 along the longitudinal direction. The end cap 50 may be embedded in an opening at an upper end of the liquid storage shell 11, that is, in an opening at the end of the liquid storage shell 11 close to the suction nozzle assembly 70. A vent hole 51 in communication with an upper end of the airflow channel 41 may be formed on the end cap 50 along the longitudinal direction.

In some embodiments, the end cap 50 may include an end cap body 52 and a nesting portion 53 extending downward from a lower end surface of the end cap body 52. The end cap body 52 and the nesting portion 53 may be coaxially arranged. The end cap body 52 is embedded in the opening at the upper end of the liquid storage shell 11, and an outer wall surface of the end cap body 52 may be in a sealed fit with the inner wall surface of the liquid storage shell 11 to prevent liquid leakage. An upper end surface of the end cap body 52 forms a supporting surface 520 for supporting the liquid absorbing member 60. An annular cavity 122 may be formed between the lower end surface of the end cap body 52 and an upper end surface of the liquid storage member 12, to prevent the end cap body 52 from squeezing the liquid storage member 12 to cause liquid leakage. In some other embodiments, the lower end surface of the end cap body 52 may also be in contact with the upper end surface of the liquid storage member 12.

The nesting portion 53 is inserted downward into the airflow channel 41 for assembly. In this embodiment, an outer wall surface of the nesting portion 53 is in a sealed fit with the inner wall surface of the vent tube 40, and the lower end surface of the end cap body 52 is in a sealed fit with an upper end surface of the vent tube 40. An outer diameter of a lower end of the nesting portion 53 may gradually increase from bottom to top to form a guide chamfer to facilitate the insertion of the nesting portion 53 into the airflow channel 41. By reducing a length by which the nesting portion 53 extends into the airflow channel 41, the length of a wall of the vent hole 51 that adsorbs vapor can be reduced, thereby reducing the loss of aroma and sweetness of the vapor and reducing the accumulation of condensate in the vent hole 51. In some embodiments, the length by which the nesting portion 53 extends into the airflow channel 41 is less than or equal to 6.5 mm.

The liquid absorbing member 60 is supported on the supporting surface 520 of the end cap 50 and in contact with the supporting surface 520, and is configured to absorb the condensate accumulated in the vent hole 51, thereby preventing the condensate accumulated in the vent hole 51 from being inhaled into a user's mouth. An air outlet hole 61 in communication with the vent hole 51 may be formed on the liquid absorbing member 60 along the longitudinal direction. The liquid absorbing member 60 is generally a liquid absorbing cotton, so as to absorb and store a large amount of condensate.

Figure 7:
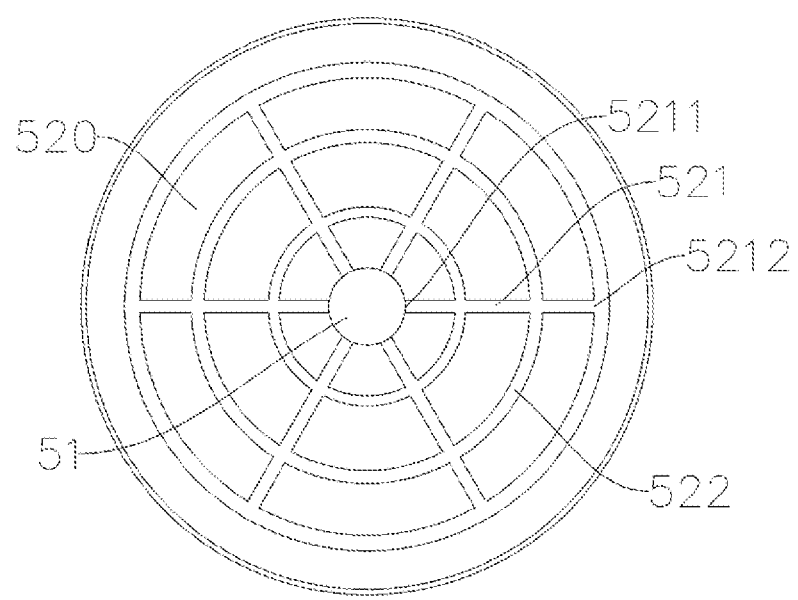
FIG. 7 is a schematic structural top view of an end cap in FIG. 4.

As shown in FIG. 7, at least one first liquid guide groove 521 may be provided on the supporting surface 520. Each of the at least one first liquid guide groove 521 includes a first end 5211 and a second end 5212 opposite to the first end 5211. The first end 5211 of the first liquid guide groove 521 is communicated with the vent hole 51, and the second end 5212 of the first liquid guide groove 521 extends in a direction away from the vent hole 51. The condensate at the vent hole 51 may be guided by the first liquid guide groove 521, and then absorbed by the liquid absorbing member 60 in contact with the first liquid guide groove 521, thereby increasing the liquid absorption speed of the liquid absorbing member 60. Preferably, the number of the first liquid guide grooves 521 is two or more, and the second end 5212 of the first liquid guide groove 521 extends at least to communicate with an outer edge of a bottom surface of the liquid absorbing member 60, thereby guiding the condensate at the vent hole 51 to the entire bottom surface of the liquid absorbing member 60.

The shape of the first liquid guide groove 521 is not limited herein, and may be, for example, a linear groove or a curved groove.

In this embodiment, the first liquid guide groove 521 is a linear groove and may extend along a radial direction of the supporting surface 520, and a maximum length of the first liquid guide groove 521 is greater than or equal to a radius of the liquid absorbing member 60.

Preferably, the number of the first liquid guide grooves 521 is proportional to a cross-sectional area of the vent hole 51, that is, a larger cross-sectional area of the vent hole 51 requires a larger number of first liquid guide grooves 521, and provides a better guiding effect. The two or more first liquid guide grooves 521 may be distributed evenly along a circumferential direction of the supporting surface 520, so that the condensate at the vent hole 51 can be evenly and quickly guided to the entire bottom surface of the liquid absorbing member 60.

Further, at least one second liquid guide groove 522 in communication with the at least the one first liquid guide groove 521 may further be provided on the supporting surface 520. The condensate at the vent hole 51 is guided to the at least one first liquid guide groove 521 and the at least one second liquid guide groove 522 in communication with the at least one first liquid guide groove 521, and then absorbed by the liquid absorbing member 60 in contact with the at least one first liquid guide groove 521 and the at least one second liquid guide groove 522. In this embodiment, the at least one second liquid guide groove 522 is in an annular shape and each of the at least one second liquid guide groove 522 in the annular shape is communicated with the two or more first liquid guide grooves 521. Preferably, the number of the second liquid guide grooves 522 may be two or more. When a plurality of the second liquid guide grooves 522 are provided, a distance between every two adjacent second liquid guide grooves 522 in the plurality of second liquid guide grooves 522 gradually decreases in the direction away from the vent hole 51, so that the condensate at the vent hole 51 can be more quickly diffused outward to the periphery and absorbed by the liquid absorbing member 60. In this embodiment, a maximum radius of the at least two second liquid guide grooves 522 is equal to the maximum length of the first liquid guide groove 521. It may be understood that, in some other embodiments, the supporting surface 520 may be provided with only the at least one first liquid guide groove 521, and not the at least one second liquid guide groove 522.

As shown in FIG. 3, the suction nozzle assembly 70 includes a suction nozzle 71. The suction nozzle is arranged on an upper end of the liquid storage shell 11. An inhalation channel 710 in communication with the air outlet hole 61 is formed on the suction nozzle 71 along the longitudinal direction. An upper portion of the liquid storage shell 11, the end cap 50, and the liquid absorbing member 60 may all be accommodated in a lower portion of the suction nozzle 71.

The air guide hole 21, the vaporization cavity 330, the airflow channel 41, the vent hole 51, the air outlet hole 61, and the inhalation channel 710 are communicated in sequence from bottom to top to form a vapor conveying channel 130. The air guide hole 21 forms an air intake channel of the vapor conveying channel 130 to introduce outside air. The airflow channel 41, the vent hole 51, the air outlet hole 61, and the air intake channel 710 together form an air outlet channel of the vapor conveying channel 130 to output vapor. When the outside air enters from the air intake channel and flows upward to the vaporization cavity 330, the outside air is mixed with the aerosol generated from the to-be-vaporized liquid heated by the heating component 30, and vapor generated after the mixing is output through the outlet channel for the user to inhale.

In some embodiments, the suction nozzle assembly 70 may further include a sealing plug 72. The sealing plug 72 may be made of an elastic material such as silica gel. The sealing plug 72 may be removably plugged at an upper end of the air intake channel 710 and may be configured to sealedly block the air intake channel 710 when the vaporizer 100 is not in use, to prevent dust or the like from entering the air intake channel 710.

Figure 8:
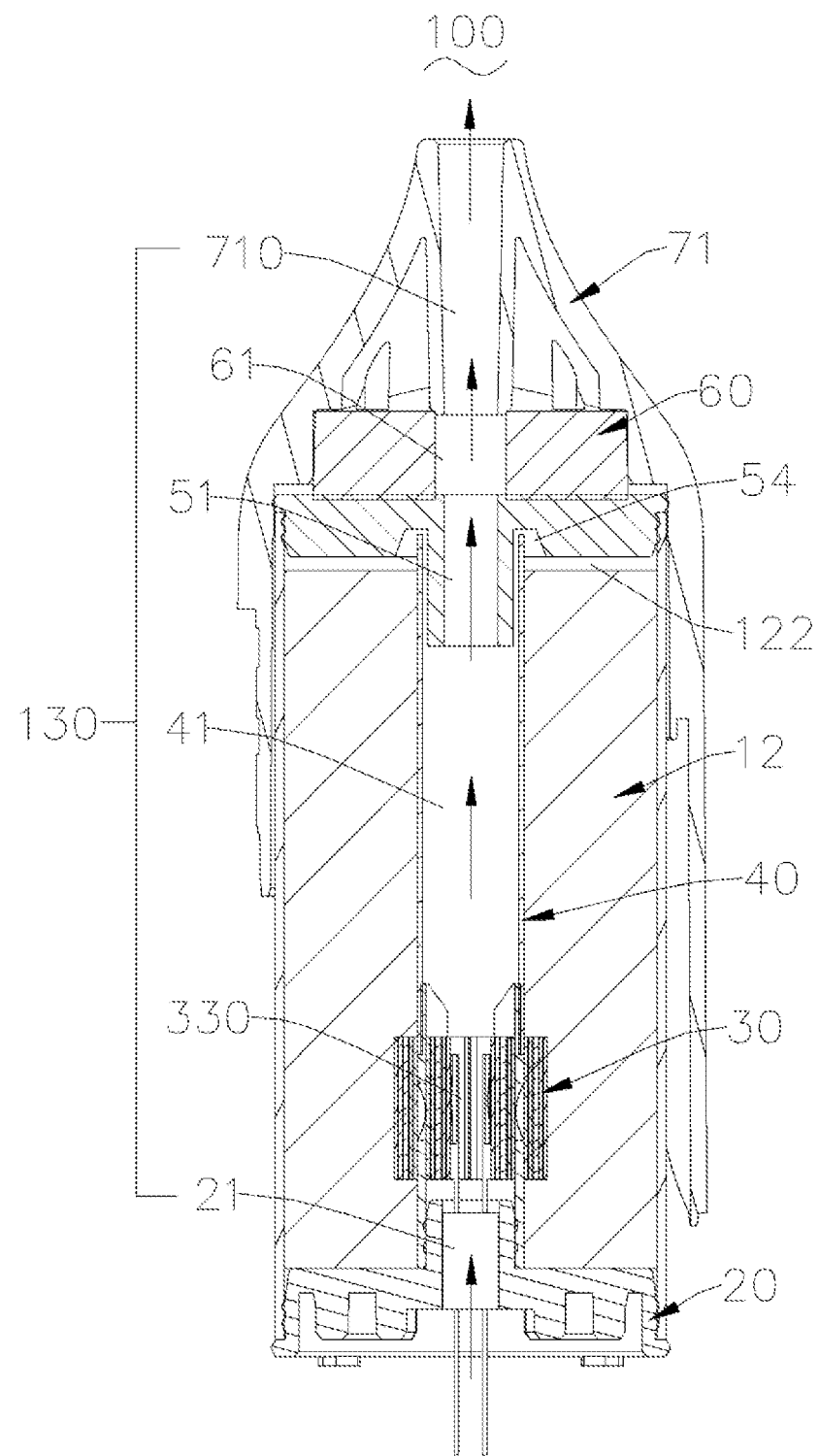
FIG. 8 is a schematic structural cross-sectional view of a vaporizer taken along a longitudinal direction according to a second embodiment of the present disclosure.
Figure 9:
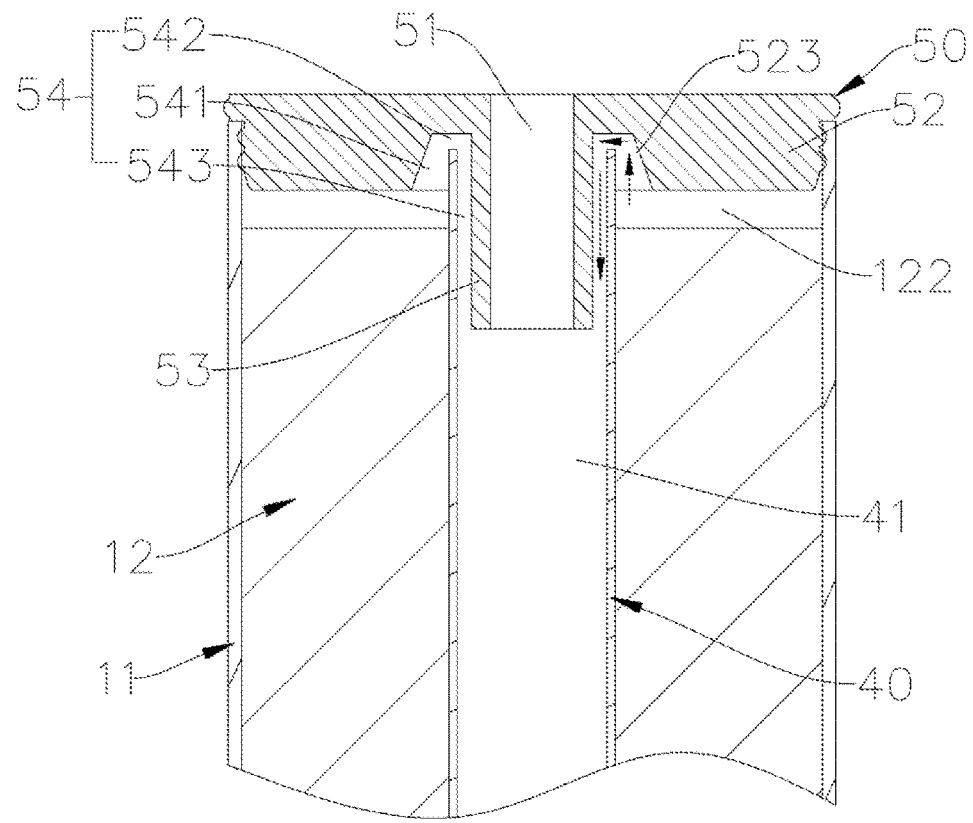
FIG. 9 is a schematic partial structural view of the vaporizer shown in FIG. 8.

FIG. 8 to FIG. 9 show the vaporizer 100 in a second embodiment of the present disclosure. The second embodiment differs from the first embodiment mainly in that, in this embodiment, the liquid storage member 12 is communicated with the outside through a pressure balance channel 54. When an ambient temperature rises, heated and expanded air inside the vaporizer 100 may be discharged to the outside of the vaporizer 100 through the pressure balance channel 54, to avoid unduly large on the to-be-vaporized liquid, thereby solving the problem of liquid leakage at a high temperature.

As described above, in this embodiment, the air guide hole 21, the vaporization cavity 330, the airflow channel 41, the vent hole 51, the air outlet hole 61, and the inhalation channel 710 are communicated in sequence from bottom to top to form the vapor conveying channel 130. The pressure balance channel 54 may be communicated with the vapor conveying channel 130, and is therefore communicated with the outside. Preferably, the pressure balance channel 54 may be formed by a clearance fit between the end cap 50 and the vent tube 40, so that the liquid storage member 12 is communicated with the airflow channel 41 and the vent hole 51 through the pressure balance channel 54, and is therefore communicated with the outside. The formation of the pressure balance channel 54 by reserving a clearance fit between the end cap 50 and the vent tube 40 is simple in design and can avoid operations such as forming a hole or groove in parts. In some embodiments, the fit clearance between the end cap 50 and the vent tube 40 may be 0-0.1 mm.

Specifically, in this embodiment, the end cap 50 may include an end cap body 52 and a nesting portion 53 extending downward from the end cap body 52 into the airflow channel 41. The vent hole 51 runs through the end cap body 52 and the nesting portion 53 along the longitudinal direction, and may be arranged coaxially with the end cap body 52 and the nesting portion 53. An annular cavity 122 may be formed between a lower end surface of the end cap body 52 and an upper end surface of the liquid storage member 12. A groove 523 is formed on a bottom surface of the end cap body 52. The groove 523 may be provided coaxially with the end cap body 52. The nesting portion 53 may extend downward from a bottom surface of the groove 523.

The upper end of the vent tube 40 may be accommodated in the groove 523. A first fit clearance is formed between an inner wall surface of the groove 523 and the outer wall surface of the vent tube 40. The first fit clearance forms a first channel 541 in communication with the cavity 122. A second fit clearance is formed between the bottom surface of the groove 523 and an upper end surface of the vent tube 40. The second fit clearance forms a second channel 542 in communication with the first channel 541. A third fit clearance is formed between the outer wall surface of the nesting portion 53 and the inner wall surface of the vent tube 40. The third fit clearance forms a third channel 543 in communication with the second channel 542. The first channel 541, the second channel 542, and the third channel 543 are communicated in sequence to form the pressure balance channel 54 that communicates the cavity 122 with the airflow channel 41. When the ambient temperature rises, heated and expanded air in the cavity 122 and heated and expanded air in the liquid storage member 12 are discharged into the airflow channel 41 through the first channel 541, the second channel 542, and the third channel 543 in sequence, and then discharged to the outside of the vaporizer 100 through the vapor conveying channel 130.

Figure 10:
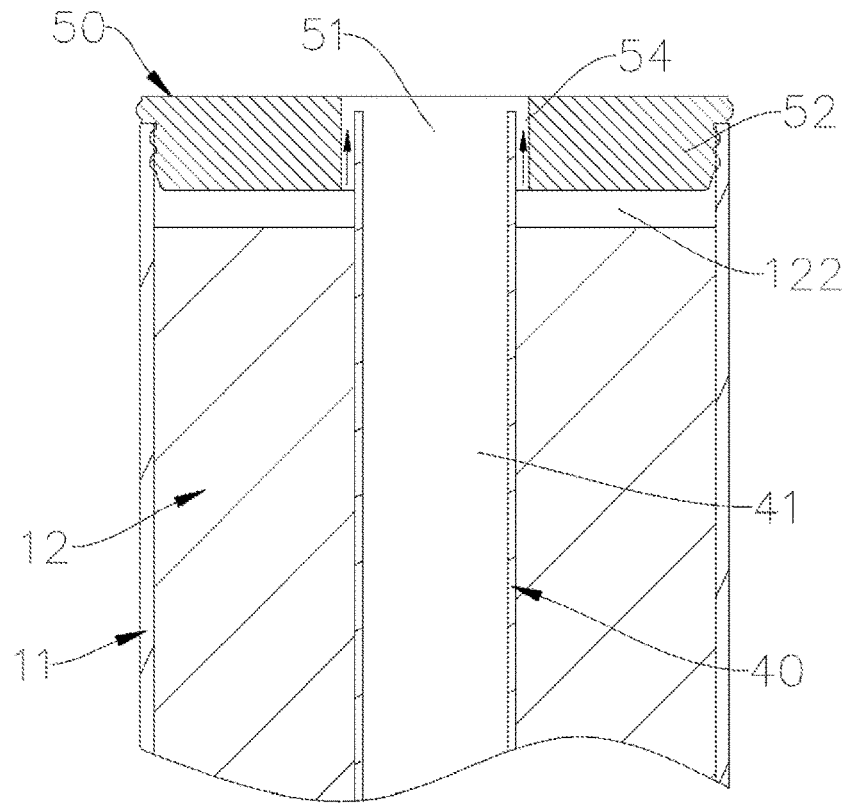
FIG. 10 is a schematic partial structural cross-sectional view of a vaporizer according to a third embodiment of the present disclosure.

FIG. 10 shows a vaporizer 100 in a third embodiment of the present disclosure. The third embodiment differs from the second embodiment mainly in that, in this embodiment, the end cap 50 includes only an end cap body 52. Specifically, the vent hole 51 runs through the end cap body 52 along the longitudinal direction, and the upper end of the vent tube 40 extends into and is communicated with the vent hole 51. A fit clearance is formed between the outer wall surface of the vent tube 40 and the wall of the vent hole 51. The fit clearance forms the pressure balance channel 54 that communicates the cavity 122 with the vent hole 51.

Figure 11:
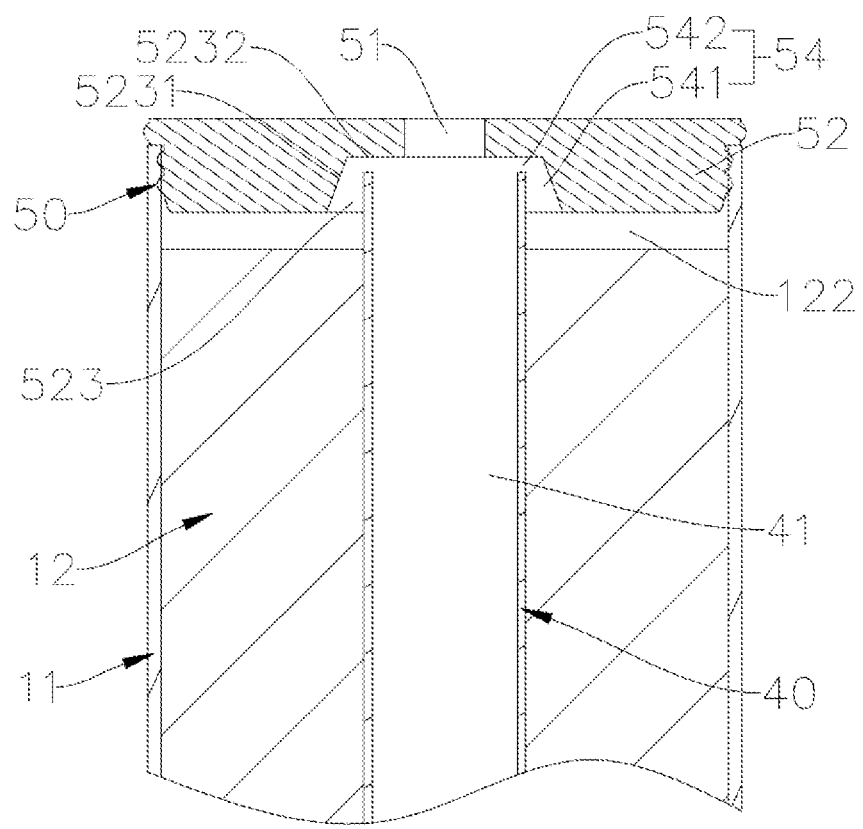
FIG. 11 is a schematic partial structural cross-sectional view of a vaporizer according to a fourth embodiment of the present disclosure.

FIG. 11 shows a vaporizer 100 in a fourth embodiment of the present disclosure. The fourth embodiment differs from the second embodiment mainly in that, in this embodiment, the end cap 50 includes only an end cap body 52. Specifically, the vent hole 51 extends downward from an upper end surface of the end cap body 52. A groove 523 in communication with the vent hole 51 is formed on a bottom surface of the end cap body 52. An outer diameter of the groove 523 is larger than that of the vent hole 51. The upper end of the vent tube 40 may be accommodated in the groove 523. A first fit clearance is formed between an inner wall surface 5231 of the groove 523 and the outer wall surface of the vent tube 40. The first fit clearance forms a first channel 541 in communication with the cavity 122. A second fit clearance is formed between a bottom surface 5232 of the groove 523 and the upper end surface of the vent tube 40. The second fit clearance forms a second channel 542 in communication with the first channel 541. The first channel 541 and the second channel 542 are communicated in sequence to form the pressure balance channel 54 that communicates the cavity 122 with the airflow channel 41 and the vent hole 51.

Figure 12:
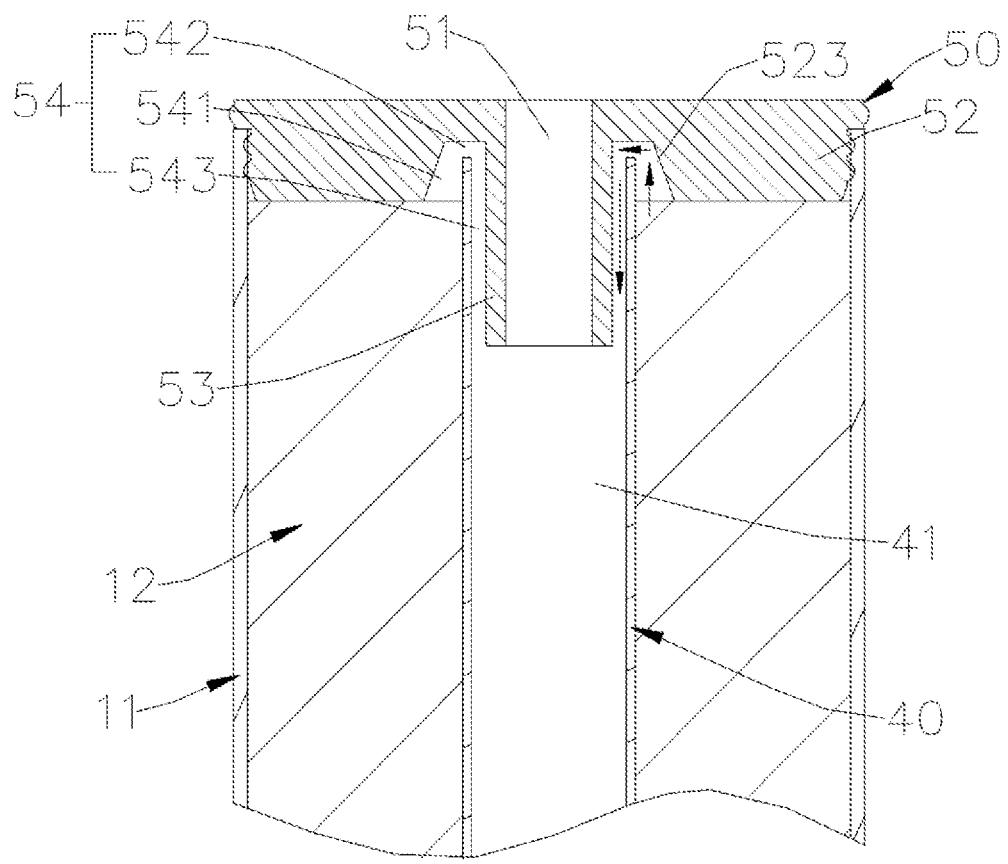
FIG. 12 is a schematic partial structural cross-sectional view of a vaporizer according to a fifth embodiment of the present disclosure.

FIG. 12 shows a vaporizer 100 in a fifth embodiment of the present disclosure. The fifth embodiment differs from the second embodiment mainly in that, in this embodiment, the lower end surface of the end cap body 52 is in contact with the upper end surface of the liquid storage member 12, that is, no cavity 122 is formed between the lower end surface of the end cap body 52 and the upper end surface of the liquid storage member 12. Correspondingly, in this embodiment, the first channel 541 of the pressure balance channel 54 is communicated with the liquid storage member 12. When the ambient temperature rises, heated and expanded air in the liquid storage member 12 is discharged into the airflow channel 41 through the first channel 541, the second channel 542, and the third channel 543 in sequence, and then discharged to the outside of the vaporizer 100 through the vapor conveying channel 130.

It may be understood that, the technical features may be used in any combination without limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A vaporizer, comprising:
   a liquid storage shell, with a liquid storage space and an airflow channel being formed within the liquid storage shell;
   an end cap covering one end of the liquid storage space, a vent hole in communication with the airflow channel being formed on the end cap; and
   a liquid absorbing member arranged on the end cap, an air outlet hole in communication with the vent hole being formed on the liquid absorbing member,
   wherein the end cap comprises a supporting surface configured for contact with the liquid absorbing member,
   wherein a first liquid guide groove is provided on the supporting surface,
   wherein the at least one first liquid guide groove is in contact with the liquid absorbing member, and
   wherein the first liquid guide groove comprises a first end in communication with the vent hole and a second end away from the vent hole,
   wherein a plurality of second liquid guide grooves are provided coaxially and at intervals on the supporting surface,
   wherein the plurality of second liquid grooves are connected to each other through the first liquid guide groove, and
   wherein a distance between every two adjacent second liquid guide grooves of the plurality of second liquid guide grooves decreases in a direction from first end of the first liquid guide groove to the second end of the first liquid guide groove.

2. The vaporizer of claim 1, wherein the second end of the first liquid guide groove extends at least to communicate with an outer edge of the liquid absorbing member.

3. The vaporizer of claim 1, wherein two or more first liquid guide grooves are provided on the supporting surface.

4. The vaporizer of claim 3, wherein the two or more first liquid guide grooves are distributed evenly along a circumferential direction of the supporting surface.

5. The vaporizer of claim 1, wherein the first liquid guide groove comprises a linear groove or a curved groove.

6. The vaporizer of claim 1, wherein the first liquid guide groove comprises a linear groove and extends along a radial direction of the supporting surface.

7. The vaporizer of claim 6, wherein a maximum length of the first liquid guide groove is greater than or equal to a radius of the liquid absorbing member.

8. The vaporizer of claim 1, wherein a number of the first liquid guide grooves is proportional to a cross-sectional area of the vent hole.

9. The vaporizer of claim 1, wherein a second liquid guide groove of the plurality of second liquid guide grooves has an annular shape.

10. The vaporizer of claim 1, wherein the liquid absorbing member comprises a liquid absorbing cotton.

11. The vaporizer of claim 1, wherein the end cap comprises a cylindrical nesting portion extending into the airflow channel.

12. The vaporizer of claim 11, wherein a length by which the nesting portion extends into the airflow channel is less than or equal to 6.5 mm.

13. The vaporizer of claim 1, wherein a material of the end cap comprises silica gel.

14. The vaporizer of claim 1, further comprising:
    a vent tube inserted into the liquid storage shell,
    wherein the airflow channel is defined by an inner wall surface of the vent tube, and
    wherein the liquid storage space is defined between an outer wall surface of the vent tube and an inner wall surface of the liquid storage shell.

15. The vaporizer of claim 14, further comprising:
    a liquid storage member arranged in the liquid storage space,
    wherein the vent tube is inserted into the liquid storage member.

16. The vaporizer of claim 1, further comprising:
    a suction nozzle arranged on one end of the liquid storage shell,
    wherein an inhalation channel in communication with the air outlet hole is formed on the suction nozzle.

17. An electronic vaporization device, comprising:
    a vaporizer, wherein the vaporizer comprises:
    a liquid absorbing member having an air outlet hole; and
    an end cap having a vent hole in communication with the air outlet hole,
    wherein the end cap comprises a supporting surface to support the liquid absorbing member,
    wherein a first liquid guide groove is provided on the supporting surface of the end cap,
    wherein the first liquid guide groove comprises a first end in communication with the vent hole and a second end away from the vent hole,
    wherein a plurality of second liquid guide grooves are provided coaxially on the supporting surface,
    wherein the plurality of second liquid grooves are connected to each other through the first liquid guide groove, and
    wherein a distance between every two adjacent second liquid guide grooves of the plurality of second liquid guide grooves decreases in a direction from first end of the first liquid guide groove to the second end of the first liquid guide groove.

* * * * *